United States Patent
Matthews et al.

(10) Patent No.: US 12,124,155 B2
(45) Date of Patent: Oct. 22, 2024

(54) BACKDROP STAND

(71) Applicant: The F.J. Westcott Company, Maumee, OH (US)

(72) Inventors: Christian Bradley Matthews, Holly Springs, NC (US); Brandon Maxwell Heiss, Perrysburg, OH (US); Jacob Ethan Collins, Ada, OH (US)

(73) Assignee: The F.J. Westcott Company, Maumee, OH (US)

( * ) Notice: Subject to any disclaimer, the term of this patent is extended or adjusted under 35 U.S.C. 154(b) by 96 days.

(21) Appl. No.: 18/189,396

(22) Filed: Mar. 24, 2023

(65) Prior Publication Data

US 2023/0333456 A1    Oct. 19, 2023

Related U.S. Application Data

(60) Provisional application No. 63/363,142, filed on Apr. 18, 2022.

(51) Int. Cl.
*G03B 17/56* (2021.01)
*G03B 15/10* (2021.01)

(52) U.S. Cl.
CPC ......... *G03B 17/561* (2013.01); *G03B 15/10* (2013.01)

(58) Field of Classification Search
CPC .............................. G03B 17/561; G03B 15/10
USPC ......................................................... 248/469
See application file for complete search history.

(56) References Cited

U.S. PATENT DOCUMENTS

| | | | | |
|---|---|---|---|---|
| 5,062,606 A | * | 11/1991 | Hoshino | ................ F16M 11/28 |
| | | | | 248/169 |
| 11,606,946 B1 | * | 3/2023 | Kowalski | ............... A01K 97/10 |

OTHER PUBLICATIONS

Westcott, X-Drop Backdrop Stand (5'X7') https://www.fjwestcott.com/products/x-drop-stand.

* cited by examiner

*Primary Examiner* — Todd M Epps
(74) *Attorney, Agent, or Firm* — Marshall & Melhorn, LLC

(57) ABSTRACT

A backdrop stand may have a hub with an arm receiving portion with an arm opening. An arm may be selectively located in the arm opening and moved between a first position and a second position to permit backdrops of different sizes to be used with the stand.

13 Claims, 7 Drawing Sheets

BACKDROP STAND

BACKGROUND

Backdrop stands for photography uses provide support for backdrops against which subjects may be photographed. The stands hold the backdrop in a fixed position.

Different stand sizes have developed. Some stands may be used in studio type settings and can be quite large. They can support a relatively large background. Smaller stands have been developed that are more portable and they support smaller backdrops.

It would be advantageous for a stand to be portable and be adaptable to work with both large and small backdrops.

SUMMARY

In one aspect, a backdrop stand may have a hub comprising a leg receiving portion and an arm receiving portion connected to the leg receiving portion. The arm receiving portion may comprise an upper surface with a central opening and an outer opening with a different shape than the central opening, and at least one tab. The at least one tab may have a first end portion positioned over an aperture connecting a front surface of the arm receiving portion and a receptacle extending within the arm receiving portion and a second end portion attached to the front surface.

In another aspect, the leg receiving portion may have three spaced apart and angled leg tubes and a slide post tube centrally located between the leg tubes.

In another aspect, a slide post may be located in the slide post tube, and a slide post ring may be located about the slide post tube, and a guide leg may be attached to the slide post ring, and the slide post ring may be attached to a tubular leg adaptor.

In another aspect, the upper surface of the arm receiving portion may be arc shaped.

In another aspect, the upper surface of the arm receiving portion may have the central opening bounded by two outer openings, where the outer openings have a different shape than the central opening.

In another aspect, the front surface of the arm receiving portion has tabs and the rear surface of the arm receiving portion has tabs, where the front and rear surface tabs may be located over receptacles formed in the arm receiving portion.

In another aspect, each tab may be located over a respective aperture and each aperture may be in communication with a respective receptacle.

In another aspect, the arm receiving portion and the leg receiving portion may be one piece, integrally formed, and unitary.

In another aspect, a backdrop stand may have a hub, the hub comprising a leg receiving portion having a plurality of legs tubes, an arm receiving portion having a plurality of arm receptacles and openings for each of the receptacles. Legs may be adapted to be selectively received in the leg tubes. An arm may be adapted to be selectively received in one of the openings of one of the receptacles in a first position where a first gap may be located between an outboard wall of the receptacle and the arm and a second position where a second gap may be located between an inboard wall of the receptacle and the arm.

In another aspect, a method of use of a backdrop stand may comprise providing a hub with an arm receiving portion, the arm receiving portion have an arm receptacle, locating a hub end portion of an arm into the arm receptacle adjacent an inboard wall of the arm receptacle to provide a first position of the arm in the hub and moving the hub end portion of the arm in the arm receptacle adjacent an outboard wall of the arm receptacle to provide a second position of the arm in the hub.

In another aspect, a spring biased pin extending from the hub end portion of the arm may extend into a pin aperture in the arm receiving portion to selectively lock the arm in the first position.

In another aspect, a tab on the arm receptable may be selectively pressed to move the pin out of engagement with the pin aperture to release the arm from the first position.

In another aspect, a gap may be created between an inboard wall of the arm receptacle and the arm when the arm is moved to the second position.

BRIEF DESCRIPTION OF THE DRAWINGS

The advantages of the present design will become readily apparent to those skilled in the art from the following detailed description when considered in the light of the accompanying drawings in which.

DETAILED DESCRIPTION OF THE PREFERRED EMBODIMENTS

It is to be understood that the device may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless expressly stated otherwise.

Figure 1:
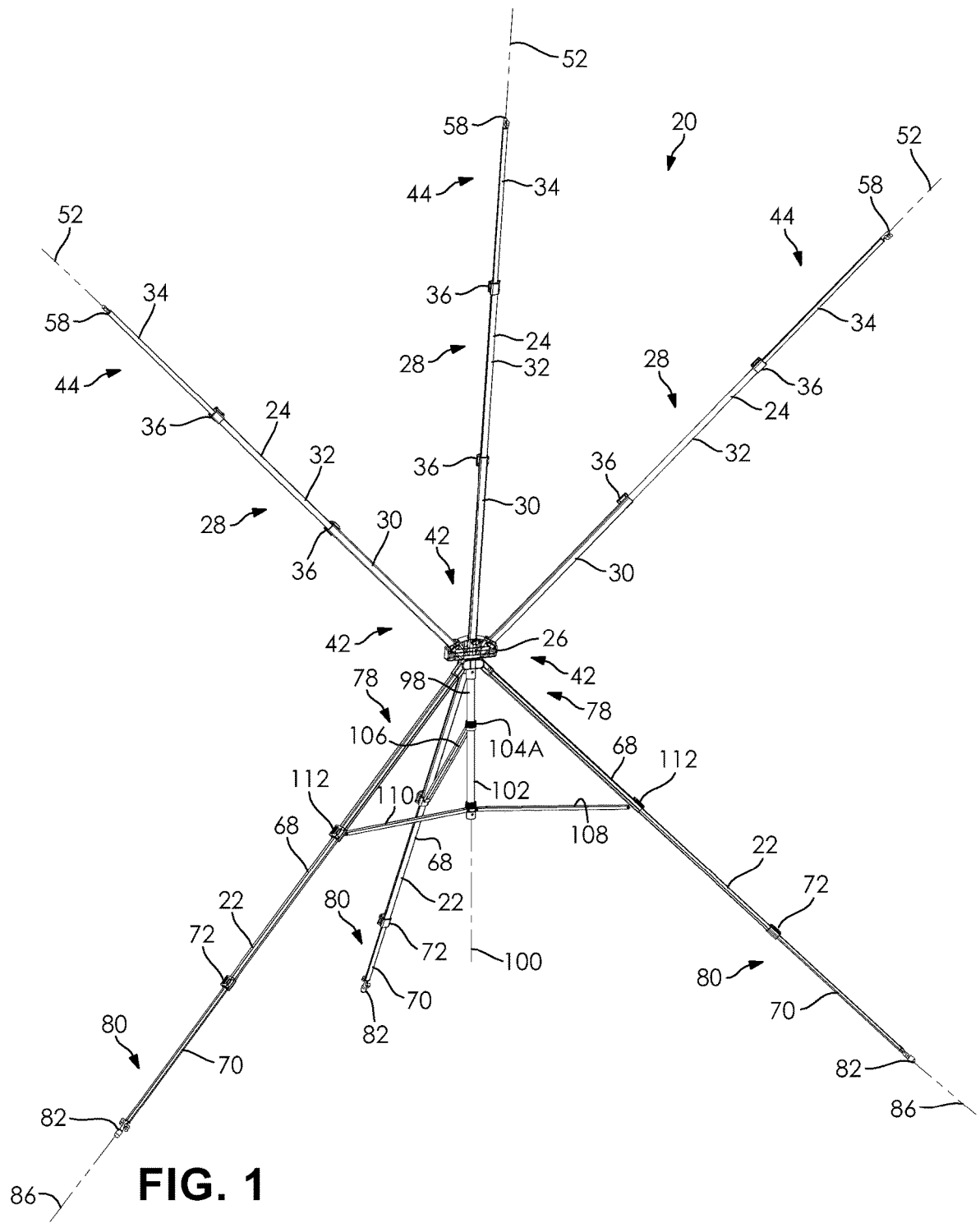
FIG. 1 is a rear perspective view of one embodiment of the device in an extended condition.
Figure 2:
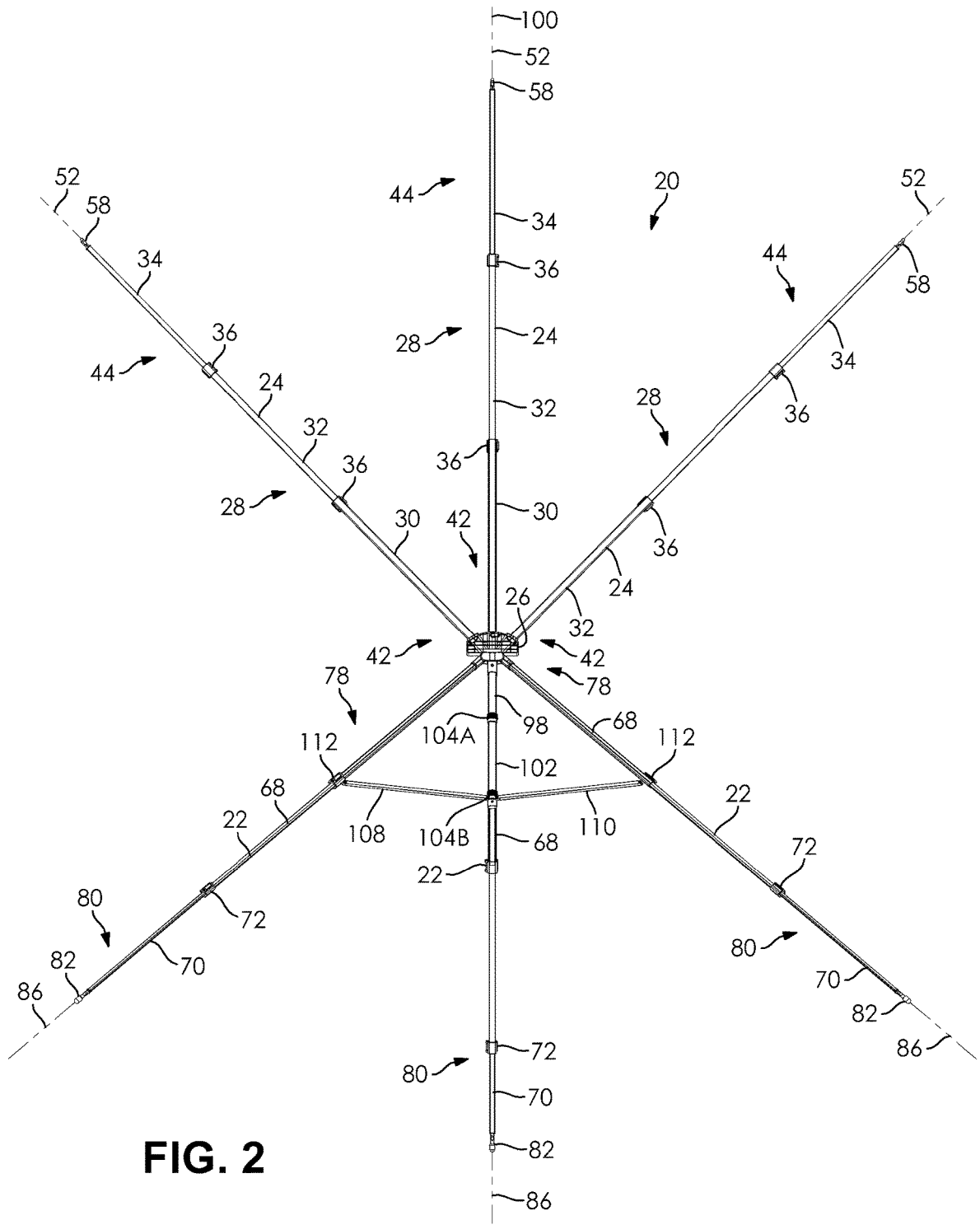
FIG. 2 is a back view of the device from FIG. 1.
Figure 3:
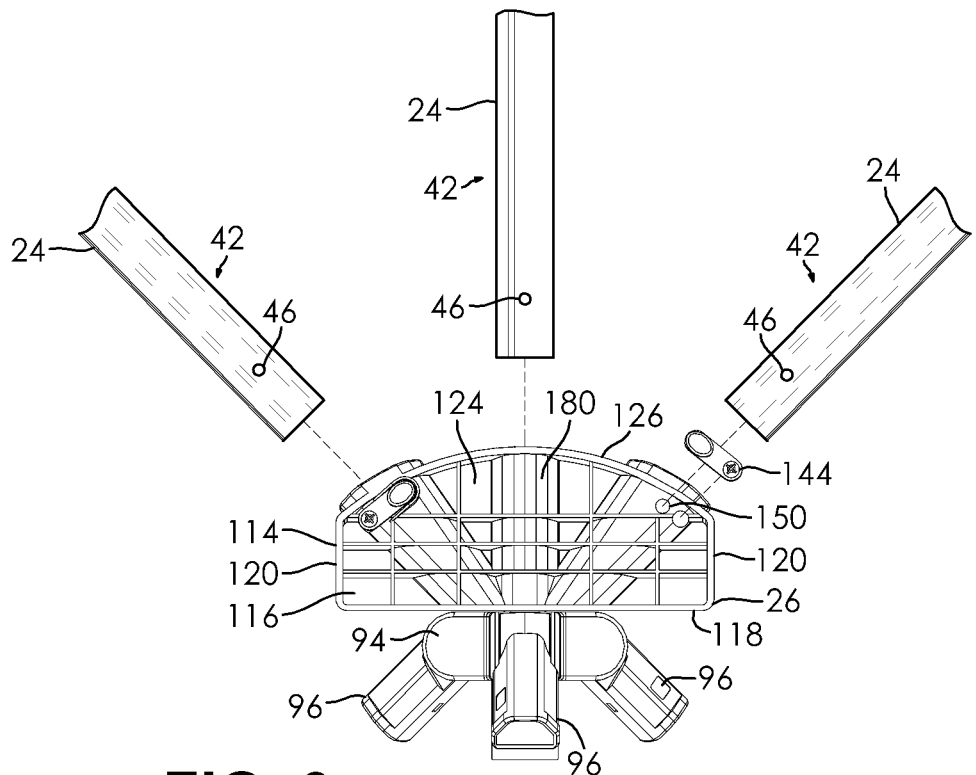
FIG. 3 is a rear view of a detail of the device with arms exploded from a hub.

Turning now to FIGS. 1-2, one embodiment of a backdrop stand 20 is depicted. The stand 20 may have three lower legs 22 and three upper arms 24, where the upper and lower legs and arms 22, 24 may be connected together by a hub 26. While the figures depict three upper arms 24 and three lower legs 22, other numbers of arms 24 and legs 22 may be permissible. The figures also depict the upper arms 24 and the lower legs 22 angled with respect to the hub 26 and one another. While the arms 24 and legs 22 are depicted at certain angles, other angles may be permissible. Further, as will be appreciated below, the lower legs 22 may be adapted to selectively move with respect to one another; the upper arms 26 may also be adapted for selective movement.

Each upper arm 24 may be comprised of at least one rod 28. In some cases, each arm 24 may be comprised of at least a first rod 30 and a second rod 32, where the second rod 32 may selectively telescope at least partially into the first rod 30. In some embodiments, a third rod 34 may be provided. The third rod 34 may selectively telescope at least partially within the second rod 32.

The first, second and third rods 30, 32, 34 of each arm 24 may be co-axial. In such an embodiment, the rods 30, 32, 34 may be at least partially hollow tubes with generally circular cross-sections. The cross-sections may decrease in diameter from the first rod 30 to the third rod 34.

One or more latches 36 or clasps may be used to secure the second rod 32 with respect to the first rod 30 and/or the second rod 32 with respect to the third rod 34. For example, a latch 36 may be located at least partially about an outside surface 38 of a rod 30 or 32.

Figure 10:
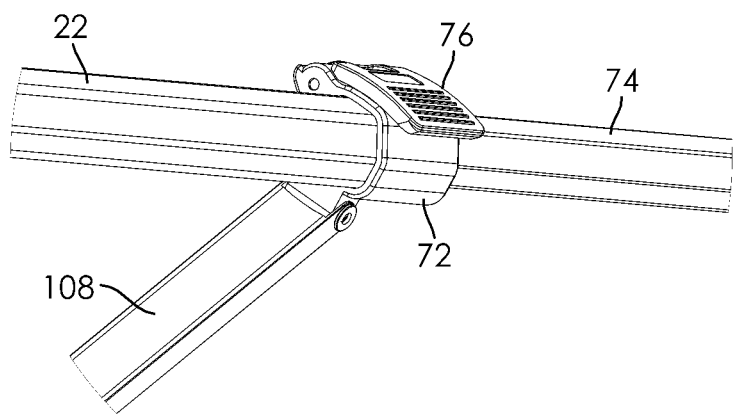
FIG. 10 depicts one embodiment of a latch.

The latch 36 may have a hinged lever 40, or related device, that circumferentially draws two portions of the latch 36 together, thus at least partially enclosing and securing a smaller diameter rod within a larger diameter rod therein. One embodiment of the latch 36 may be seen in FIG. 10.

When released, the latch 36 permits selective telescopic, axial movement of the second rod 32 with respect to the first rod 30 and the same for the third rod 34 with respect to the second rod 32.

Referring now to FIGS. 1-9, each rod 30, 32, 34 associated with each arm 24 may have any number of cross-sectional shapes including round, oval, and curvilinear, including polygonal. In one embodiment, the cross-sectional shape of a rod 30, 32, 34 may be such as trapezoidal. The polygonal shape may extend the length of each arm 24 or only a portion thereof. It may be that each arm 24 is substantially the same in terms of length and cross-sectional shape along the length, but variations are permissible.

One or more of the upper arms 24 may be hollow in whole or in part along their length. It may be preferred that the arms 24 are substantially hollow along their entire length so to reduce weight.

The arms 24 may each be constructed of the same material substantially along their lengths, but the material for each arm 24 may also be varied along their lengths or among the various arms 24. In one embodiment, each arm 24 may be constructed of a lightweight material, such as metal, plastic and/or polymer. In some cases, each arm 24 is constructed of extruded aluminum substantially along its entire length.

Each arm 24 may have a hub end portion 42 and a distal end portion 44. The hub end portion 42 may be adapted to be selectively located within the hub 26. The distal end portion 44 may be on the opposite end of the arm 24 from the hub end portion 42.

Figure 5:
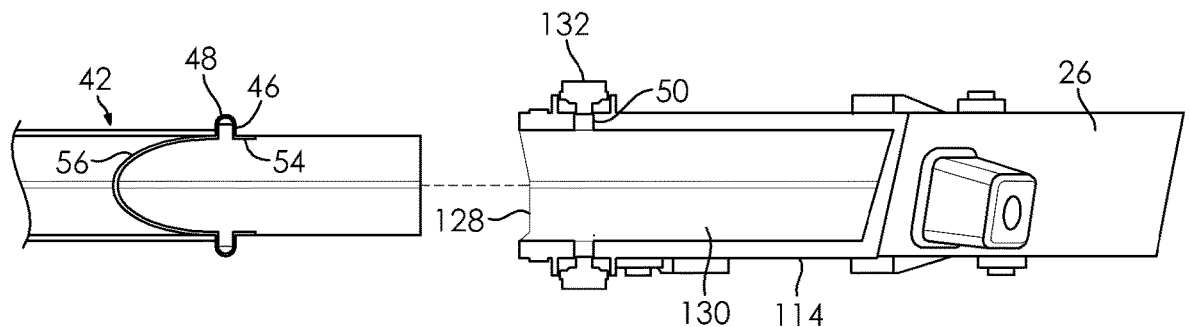
FIG. 5 is a partial cross sectional view of the hub with an arm exploded therefrom.

In some embodiments, the hub end portion 42 of an arm 24 may have at least one spring biased pin 46, as shown in FIG. 5. A first end portion 48 of the pin 46 may at least partially extend through an aperture 50 in the hub end portion 42. The first end portion 48 may extend through the aperture 50 generally transverse an arm longitudinal axis. A second end portion 54 of the pin 46 may be located within the arm 24. The second end portion 54 may be connected to a biasing member 56, such as a leaf spring or spring biased clip. The biasing member 56 may be compressed within the arm 24 such that it biases the first end portion 48 out of the aperture 50 in a default position.

Figure 6:
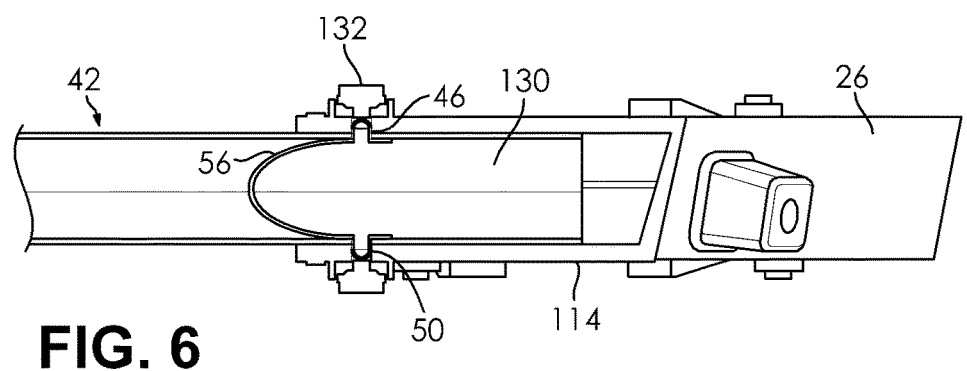
FIG. 6 is a partial cross sectional view of the hub with an arm located within the hub.

In some embodiments, two pins 46 may be used. The pins 46 may be located opposite one another on the arm 24 as shown in FIGS. 5 and 6. In some cases, the same biasing member 56 may be used to urge the pin 46 outwardly from the arm 24 which is also shown in FIGS. 5 and 6. The pins 46 are biased by the biasing member 56 to extend through respective apertures 50 as noted above.

Figure 11:
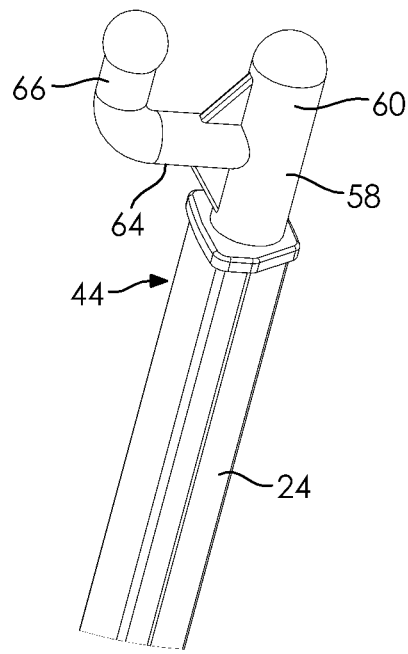
FIG. 11 depicts one embodiment of a retention device.

The distal end portion 44 on at least one arm 24 may have a retention device 58. One embodiment of a retention device 58 is depicted in FIG. 11. It may be preferred that each distal end portion 44 of each arm 24 has a retention device 58 thereon. The retention device 58 may be at least partially located within the arm 24, but other ways of connecting the retention device 58 with the arm 24 may be used. The retention device 58 may be comprised of a main portion 60 and a hook-like structure 62. The main portion 60 may be generally directed, and aligned, with the longitudinal 52 axis of the arm 24. The hook-like structure 62 may have a first section 64 that extends generally transverse the main portion 60 and a second section 66 that extends generally parallel the main portion 60. The retention device 58 may be adapted to be located within an aperture of a backdrop (not shown) to selectively secure the backdrop to the stand 20. In some embodiments, one or more retention devices 58 on one or more arms 24 may be used to support a backdrop thereon.

Each lower leg 22 may be comprised of at least one rod. In some cases, each leg may be comprised of a first rod 68 and a second rod 70, where the second rod 70 may selectively telescope at least partially into the first rod 68. The first and second rods 68, 70 of each leg 22 may be coaxial. The rods 68, 70 may be such as at least partially hollow tubes with generally circular cross-sections. The cross-sections may decrease in diameter from the first rod 68 to the second rod 70. While first and second rods 68, 70 are noted, one or more of the legs 22 may be may be provided with additional rods, such as mentioned for the arms 24 above.

One or more latches, or clasps, may be used to secure the second rod 70 with respect to the first rod 68. For example, a latch 72 may be located at least partially about an outside surface 74 of the first rod 68. The latch 72 may have a hinged lever 76, or related device, that circumferentially draws two portions of the latch 72 together, thus at least partially enclosing and securing the smaller diameter rod 70 within the larger diameter rod 68. One embodiment of the latch 72 may be seen in FIG. 10. The latch 72 may function as described above for an arm 24.

Each rod 68, 70 associated with each leg 22 may have any number of cross-sectional shapes including round, oval, and curvilinear, including polygonal. In one embodiment, the cross-sectional shape of a rod 68, 70 may be such as trapezoidal. The polygonal shape may extend the length of each leg 22 or only a portion thereof. It may be that each leg 22 is substantially the same in terms of length and cross-sectional shape along the length, but variations are permissible.

One or more of the legs 22 may be hollow in whole or in part along their length. It may be preferred that the legs 22 are substantially hollow along their entire length so to reduce weight.

The legs 22 may each be constructed of the same material substantially along their lengths, but the material for each leg 22 may also be varied along their lengths or among the various legs. In one embodiment, each leg 22 may be constructed of a lightweight material, such as metal, plastic and/or polymer. In some cases, each leg 22 is constructed of extruded aluminum substantially along its entire length.

Each leg 22 may have a hub end portion 78 and a distal end portion 80. The hub end portion 78 may be adapted to be selectively located within the hub 26, or the legs 22 may be connected to a portion associated with the hub 26. The distal end portion 80 may be on the opposite end of the leg 22 from the hub end portion 78.

The distal end portion 80 on at least one leg 22 may have a retention device 82. It may be preferred that each distal end portion 80 of each leg 22 has a retention device 82 thereon. The retention device 82 may be at least partially located within the leg 22, but other ways of connecting the retention device 82 with the leg 22 may be used.

Figure 12:
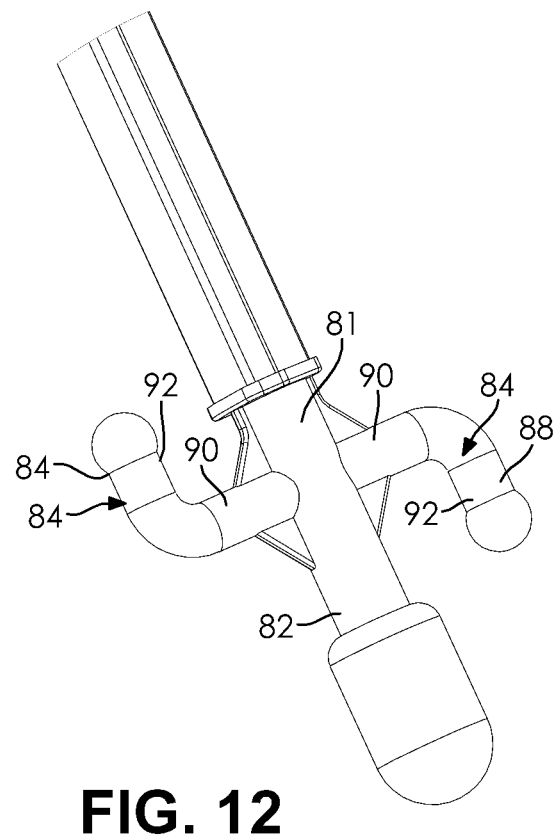
FIG. 12 depicts another embodiment of a retention device.

The retention device 82 may be comprised of a main portion 81 and a double hook-like structure 84. One embodiment of a retention device 82 may be seen in FIG. 12. The main portion 81 of the retention device 82 may be generally directed, and aligned, with a longitudinal axis or of the leg 22.

The double hook-like structure 84 may be such as two hooks 88 located back-to-back, which may form a general S-shape. Each hook 88 may have a first section 90 that extends generally transverse the main portion 82 and a second section 92 that extends generally parallel the main portion 81.

One hook 88 of the retention device 82 may be adapted to be located within an aperture of a backdrop (not shown) to selectively secure the backdrop to the stand 20. The other hook 88 on the retention device 82 may be adapted to be connected with an anchor object (not shown) to secure the stand 20 in a location. Examples of anchor objects might be such as sandbags, blocks of any construction, or other structures with sufficient weight to assist in securing the stand 20 in a location.

In some embodiments a backdrop (not shown) can be secured to one more retention devices 82 on one or more legs 22. It may be that one portion, such as a lower portion, of a backdrop is connected to one or more retention devices 82 on one or more legs 22, and another portion, such as an upper portion, of the backdrop is connected to one or more retention devices 98 on one or more of the arms 24.

Figure 7:
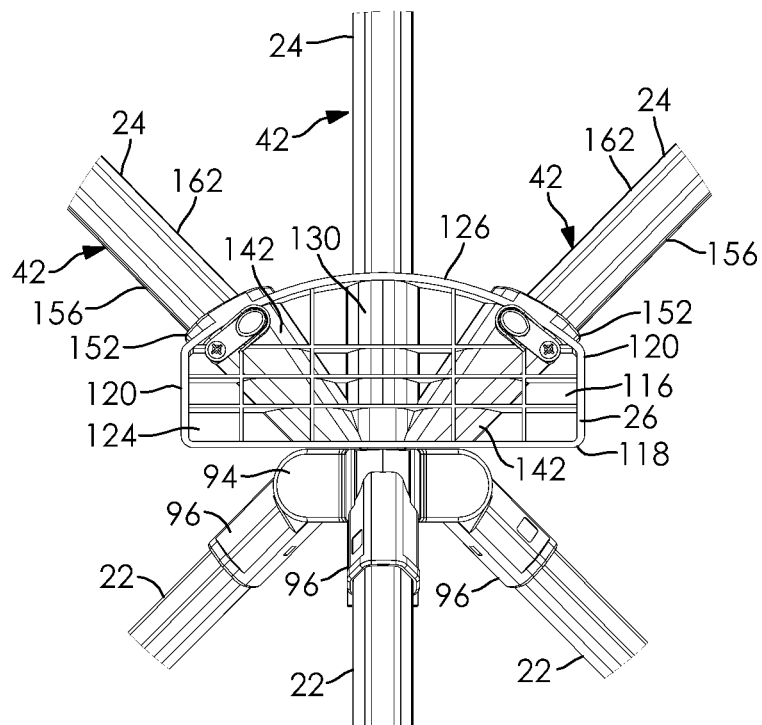
FIG. 7 is a back view of a detail of the device with the arms located within the hub in one orientation.
Figure 8:
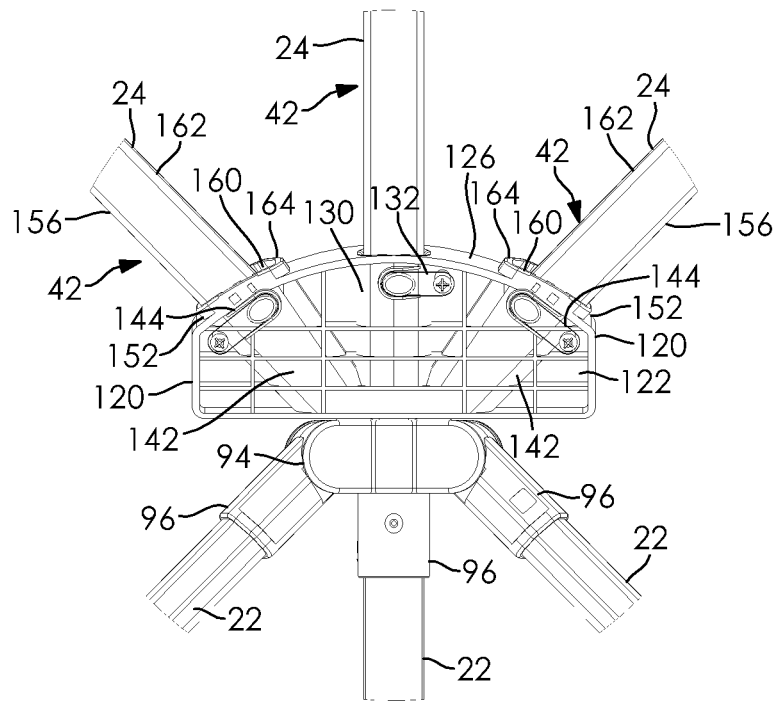
FIG. 8 is a front view of a detail of the device with the arms located within the hub in one orientation.

In some embodiments, one or more of the hub end portions 78 of the legs 22 may be located adjacent to, such as connected to, or even extending from, the hub 26, one embodiment of which may be seen in FIGS. 7 and 8. The legs 22 may be connected to a leg receiving portion 94 of the hub 26. The leg receiving portion 94 may be part of the hub 26, separate but connected to the hub 26, or separate from the hub 26. In some embodiments, the hub end portions 78 may be at least partially located within a portion of the leg receiving portion 94. For example, the leg receiving portion 94 may be comprised of one or more tubes 96. The one or more tubes 96 may have a complementary shape to the hub end portion 78 of the legs 22. In such a case, the hub end portions 78 may be selectively located within the tubes 96 of the leg receiving portion 94.

It may be that the leg receiving portion 94 is comprised of three tubes 96 that each receive one of the hub end portions 78 of the legs 22. The three tubes 96 may be located at angles with respect to one another. The angles may vary between the tubes 96 but they may be between approximately 45-135 degrees from one another. The result can be that the legs 22 extending from them form three, spaced apart points of contact on a floor surface. Lines connecting the points of contact may define a triangle.

The leg receiving portion 94 may also have a slide post tube 98. The slide post tube 98 may be similar in its construction to the other rods 30, 32, 34, 68, 70 discussed above. The slide post tube 98 may be centrally located between the legs 22 on the leg receiving portion 94. The slide post tube 98 may extend downwardly and be substantially parallel with an axis 100 of the stand 20.

The slide post tube 98 may receive at least a portion of a slide post 102 therein. The slide post 102 may be constructed of one or more posts. In the instance where the slide post 102 has more than one part, the parts may telescope with respect to one another. A latch or clamp, such as the kind mentioned above, may be used to selectively secure the parts together.

In some embodiments, at least one slide post ring 104 may be located about the slide post 102. Each ring 104 may selectively move along at least a portion of the length of the slide post 102, such as parallel with the axis 100.

Sometimes at least one guide leg may be attached to each slide post ring 104. In one case, a first guide leg 106 connects an upper slide post ring 104A with one leg 22 and a second 108 and third guide leg 110 connects a lower slide post ring 104B with two other legs 22.

It can be appreciated that depending on the position of the respective post ring 104, the respective guide leg 106, 108, 110, and thus leg 22 of the stand 20, can be changed. For example, as the upper post ring 104A is moved upwardly along the slide post 102, it draws the connected guide leg 106, 108, 110 with it, which results in the leg 22 being drawn closer to the axis 100 of the stand 20. In such a case, the overall foot print of the stand 20 may be reduced.

In some embodiments, the guide legs 106, 108, 110 may be fitted with leg adaptors 112 to connect with the legs 22. The leg adaptors 112 may be such as tubular or partially tubular portions that extend at least partially about a leg 22. The leg adaptors 112 may be adapted to selectively move, such as slide, along the legs 22. The leg adaptors 112 may be pivotally attached to the guide legs 106, 108, 100 and the slide post rings 104. In some cases, the leg adaptors 112 may have a locking feature, such as a clamp or latch, which may be as noted above, to selectively secure the leg adaptor 112 to the leg 22.

In some embodiments, the hub 26 may also be comprised of an arm receiving portion 114. The arm receiving portion 114 may be located above the leg receiving portion 94. In some cases, the arm receiving portion 114 may be formed with the leg receiving portion 94 or it may be a module that is separately formed and then later joined with the leg receiving portion 94.

The arm receiving portion 114 may have a body section 116. The body section 116 may have a lower surface 118 from, or to, which the leg receiving portion 94 is attached or connected. The lower surface 118 may extend generally transverse the axis 100 of the stand 22. In some cases, the lower surface 118, except for the connection with the leg receiving portion 94, may be substantially planar.

The body section 116 may also have two side surfaces 120. The side surfaces 120 may extend upwardly from the lower surface 118 such as in a generally transverse manner. The side surfaces 120 may extend substantially parallel one another, and they may be substantially planar.

The body section 116 may also have a front surface 122 and a back surface 124. The front and back surfaces 122, 124 may extend upwardly from the lower surface 118 such as in a generally transverse manner. The front and back surfaces 122, 124 may extend generally transverse the two side surfaces 120. The front and back surfaces 122, 124 may extend substantially parallel one another, and they may be substantially planar.

The body section 116 may also have an upper surface 126. The upper surface 126 may bound the two side surfaces 120 and the front and back surfaces 122, 124. The upper surface 126 may be curvilinear and in some embodiments may be arc-shaped.

In some embodiments, the upper surface 126 may have at least one opening 128. In the depicted embodiment, three openings 128 A, B, C, generally equally spaced from one another, may be located in the upper surface 126 as shown at least in FIG. 4. The openings 128 A, B, C may be the same in terms size and/or shape, or they may differ. In one embodiment, a central opening 128B may differ in size and/or shape with respect to the two outer openings 128A, 128C. The outer openings 128A, 128C may be located on either side of the central opening 128B in the upper surface 126.

Figure 4:
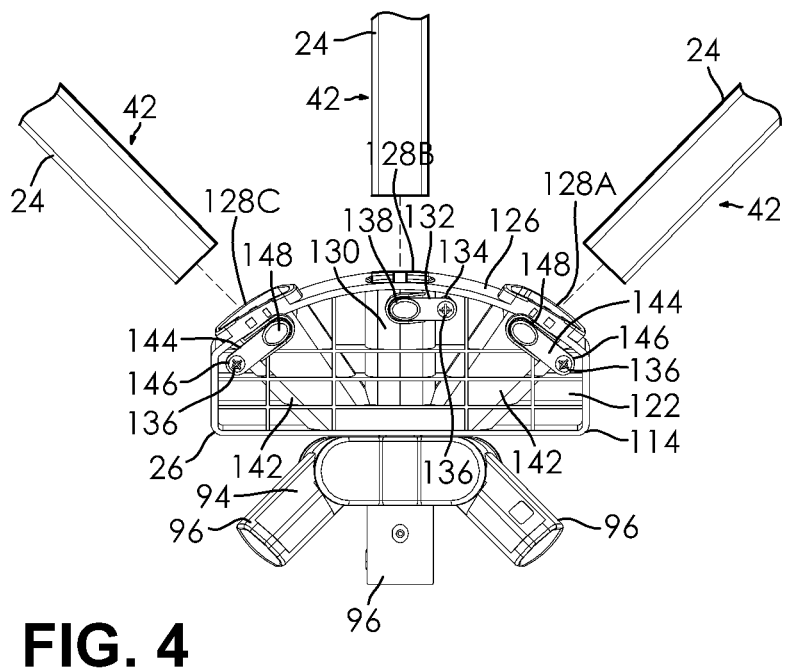
FIG. 4 is a front view of a detail of the device with the arms exploded from the hub.

The central opening 128B may be generally complementary in size and shape to the hub end portion 42 of an arm 24 as may be appreciated from at least FIG. 4. Generally, the central opening 128B may have a slightly larger dimension that the hub end portion 42 so that the hub end portion 42 can be selectively located, such as slid, in the central opening 128B, and selectively withdrawn therefrom. It may be that the central opening 128B has a complementary shape to the hub end portion 42 of a single arm 24, but it may also be that the central opening may be circular or oval and sized to accommodate the hub end portion 42 of the arm 24.

The central opening 126B may lead to a central receptacle 130. The central receptacle 130 may have a cross-sectional shape the same or similar to the shape of the central opening 126B. The central receptacle 130 may extend along the axis 100 and be substantially continuous and uni-directional. The central receptacle 130 may extend to the lower surface 118 of the body section 116, where it terminates.

At least one tab 132 may be located on the hub 26. It may be that at least a portion of the tab 132 is located on the hub 26 and at least partially overlapping the central receptacle 130.

In some embodiments, the tab 132 is located on the front surface 122 of the hub 26. The tab 132 may be constructed of a polymeric material, but other materials, such as, but not limited to, metal, plastic, rubber compounds, composite materials and/or fiber-based materials, such as wood or fiberglass, may be used. It may be preferred that regardless of its construction type, the tab 132 has some degree of resiliency and permits for plastic deformation of at least a portion thereof.

The tab 132 may have a first end portion 134 that may be secured to the hub 26, such as with a mechanical fastener 136. A second end portion 138 of the tab 132 may be located over the aperture 50 in the hub 26, as shown in FIG. 5. The aperture 50 may be positioned above and in communication with the central receptacle 130. In one embodiment, the aperture 50 may extend transversely with respect to a primary axis of the central receptacle 130.

It may be that the aperture 50 in the hub 26 aligns with the pin 46 on the arm 24 when the arm 24 is fully inserted within the central receptacle 130. In such a case, the pin 46 on the arm 24 may selectively extend through the aperture 50. The pin 46 may come in contact with the tab 132, or it may simply be close to the tab 132. The pin 46 may function to selectively secure the arm 24 to the hub 26.

In some embodiments, the second end portion 138 of the tab 132 may be moved, such as pressed, so that it moves the pin 46, such as inwardly. The tab 132 may be pressed so that the pin 46 moves out of engagement with the aperture 50 in the hub 26. This permits the arm 24 to be removed from the hub 26.

In some embodiments, the outer openings 128A, C may be different than the central opening 128B. The following will describe one of the outer openings 128A, and the same information may apply to the other outer opening 128C.

The outer opening 128A may define a larger shape than the cross-sectional shape of an arm 24. In some embodiments, the outer opening 128A may be such as oval-shaped, but curvilinear shapes and polygons are also permissible. It may be preferred that the outer opening 128A is at least wider than an arm 24, such as 10-50% wider than an arm 24.

The outer opening 128A may lead to an outer receptacle 142. The outer receptacle 142 may have a cross-sectional shape the same or similar to the shape of the outer opening 128A. The outer receptacle 142 may extend at an angle with respect to the longitudinal axis 100 and be substantially continuous and uni-directional. The angle may be between approximately 30-55 degrees off the longitudinal axis 100. The outer receptacle 142 may extend to the lower surface 118 of the body section 116, where it terminates.

A second tab 144, which may be the same or similar to the above-mentioned tab 132, may be located on the hub 26. It may be that at least a portion of the second tab 144 is located on the hub 26 and at least partially overlapping the outer receptacle 142. The second tab 144 may be constructed as noted above for the central receptacle 130.

The second tab 144 may have a first end portion 146 that may be secured to the hub 26, such as with a mechanical fastener 136. A second end portion 148 of the tab 144 may be located over an aperture 150 in the hub 26. The aperture 150 may be positioned above and in communication with the outer receptacle 142. In one embodiment, the aperture 150 may extend transversely with respect to the primary direction of the outer receptacle 150.

It may be that the aperture 150 in the hub 26 aligns with the pin 46 on the arm 24 when the arm 24 is fully inserted within the outer receptacle 150. In such a case, the pin 46 on the arm 24 may selectively extend through the aperture 150. The pin 46 may come in contact with the tab 144, or it may simply be close to the tab 144. The pin 46 may function to selectively secure the arm 24 to the hub 26.

In some embodiments, the second end portion 148 of the tab 144 may be moved, such as pressed, so that it moves the pin 46, such as inwardly. The tab 144 may be pressed so that the pin 46 moves out of engagement with the aperture 150 in the hub 26. This permits the arm 24 to be removed from the hub 26. It also permits for the arm 24 to be moved or pivoted outwardly within the outer receptacle 142. For example, with the pin 46 removed from the aperture 150, the arm 24 may be drawn via a pivoting or sliding motion by gravity to an outer wall 152 of the outer receptacle 142. In this orientation, an arm 24 in the outer receptacle 142 will change angles with respect to an arm 24 in the central receptacle 130. Namely, the angle between the arms 24 will increase compared to the angle when an arm 24 in the outer receptacle 142 is retained by the pin 46. By providing selective relative movement between arms 24, it permits backdrops of different sizes to be located on the arms 24. By way of one example only, when the arms 24 are engaged with the pins 46, the arms 24 may be suited to hold a 5'×7' backdrop. The arms 24 in the narrower, or closer, orientation may be appreciated in FIG. 9. However, when the arms 24 are disengaged with the pins 46, but still engaged with the hub 26, the arms 24 may then be suited to hold an 8'×8' backdrop, which is reflected in FIGS. 1-2 and 7-9. As can be appreciated from FIGS. 3 and 4, tabs 144 for the outer receptacles 142 may be located on either or both front and back surface 122, 124 of the hub 26 to engage with respective pins 46.

Figure 9:
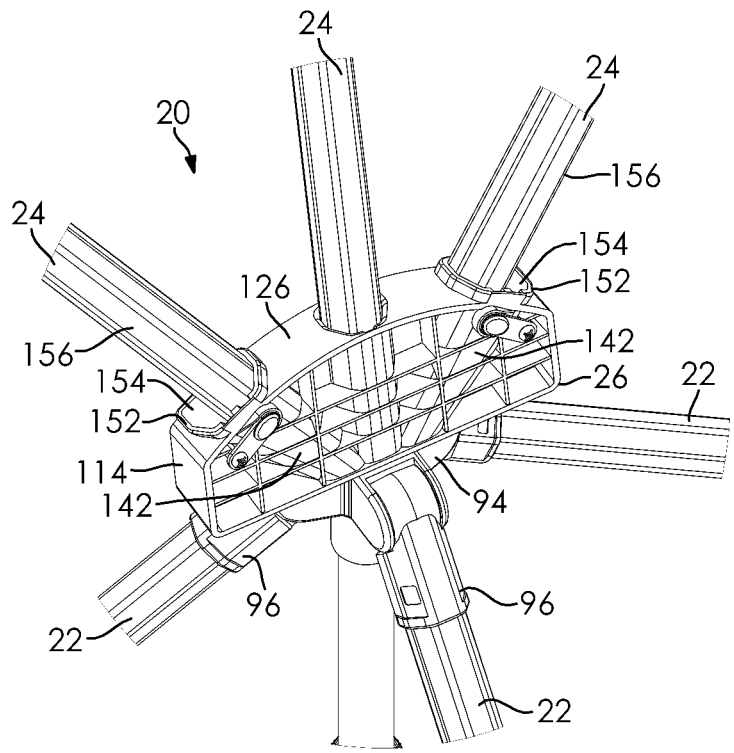
FIG. 9 depicts a detail of the device with the arms located within the hub in one orientation.

When the arms 24 are engaged with the pins 46, the pins 46 fix the arms 24 within the outer receptacles 142, such as shown in FIG. 9. In FIG. 9, it can be seen that there is a first gap 154 between an outer wall, or surface 156, of the arm 24 and the outer wall 152 of the receptacle 142. Alternatively, when the pins 46 are released from the arms 24, and the arms 24 are allowed to rest against the outer wall 152 their respective outer receptacle 142 and the first gap 154 is closed or substantially closed. However, a second gap 160 is formed between an inner wall, or surface 162, of the arm 24 and an inner wall 164 of the receptacle 142, which may be seen in FIGS. 1-2 and 7-9.

In accordance with the provisions of the patent statutes, the present device has been described in what is considered to represent its preferred embodiments. However, it should be noted that the device can be practiced otherwise than as specifically illustrated and described without departing from its spirit or scope.

What is claimed is:

1. A backdrop stand, comprising:
   a hub, comprising:
   a leg receiving portion, and
   an arm receiving portion connected to the leg receiving portion, the arm receiving portion comprising:
   an upper surface with a central opening and an outer opening with a different shape than the central opening, and
   at least one tab, comprising:
   a first end portion positioned over an aperture connecting a front surface of the arm receiving portion and a receptacle extending within the arm receiving portion and
   a second end portion attached to the front surface.

2. The backdrop stand of claim 1, wherein the leg receiving portion has three spaced apart and angled leg tubes and a slide post tube centrally located between the leg tubes.

3. The backdrop stand of claim 1, wherein a slide post is located in the slide post tube, and wherein a slide post ring is located about the slide post tube, and wherein a guide leg is attached to the slide post ring, and wherein the slide post ring is attached to a tubular leg adaptor.

4. The backdrop stand of claim 1, wherein the upper surface of the arm receiving portion is arc shaped.

5. The backdrop stand of claim 1, wherein the upper surface of the arm receiving portion has the central opening bounded by two outer openings, wherein the outer openings have a different shape than the central opening.

6. The backdrop stand of claim 1, wherein the front surface of the arm receiving portion has tabs and the rear surface of the arm receiving portion has tabs, wherein the front and rear surface tabs are located over receptacles formed in the arm receiving portion.

7. The backdrop stand of claim 6, wherein each tab is located over a respective aperture and each aperture is in communication with a respective receptacle.

8. The backdrop stand of claim 1, wherein the arm receiving portion and the leg receiving portion are one piece, integrally formed, and unitary.

9. A backdrop stand, comprising:
   a hub, comprising:
   a leg receiving portion having a plurality of legs tubes;
   an arm receiving portion having a plurality of arm receptacles and openings for each of the receptacles;
   legs adapted to be selectively received in the leg tubes; and
   an arm adapted to be selectively received in one of the openings of one of the receptacles in a first position where a first gap is located between an outboard wall of the receptacle and the arm and a second position where a second gap is located between an inboard wall of the receptacle and the arm.

10. A method of use of a backdrop stand, comprising:
    providing a hub with an arm receiving portion, the arm receiving portion have an arm receptacle;
    locating a hub end portion of an arm into the arm receptacle adjacent an inboard wall of the arm receptacle to provide a first position of the arm in the hub;
    moving the hub end portion of the arm in the arm receptacle adjacent an outboard wall of the arm receptacle to provide a second position of the arm in the hub.

11. The method of claim 10, wherein a spring biased pin extending from the hub end portion of the arm extends into a pin aperture in the arm receiving portion to selectively lock the arm in the first position.

12. The method of claim 10, wherein a tab on the arm receptable is selectively pressed to move the pin out of engagement with the pin aperture to release the arm from the first position.

13. The method of claim 10, wherein a gap is created between an inboard wall of the arm receptacle and the arm when the arm is moved to the second position.

* * * * *